United States Patent [19]

Linde et al.

[11] 4,070,139
[45] Jan. 24, 1978

[54] MOLDING MACHINE

[75] Inventors: Joachim Linde, Leiselheim; Wolfgang Späth, Lahr, both of Germany

[73] Assignee: Klockner - Werke AG, Duisburg, Germany

[21] Appl. No.: 634,339

[22] Filed: Nov. 21, 1975

[30] Foreign Application Priority Data

Nov. 21, 1974 Germany .............................. 2455088

[51] Int. Cl.² .......................... B28B 17/00; B29B 1/06
[52] U.S. Cl. .................................... 425/188; 425/542; 366/79
[58] Field of Search .................... 259/9, 10, 191, 192, 259/193, DIG. 13; 425/188, 190, 192, 208, 542

[56] References Cited

U.S. PATENT DOCUMENTS

| 3,335,464 | 8/1967 | Schwartz | 425/156 X |
| 3,526,931 | 9/1970 | Schwartz | 425/192 |

*Primary Examiner*—Robert W. Jenkins
*Attorney, Agent, or Firm*—Michael J. Striker

[57] ABSTRACT

A molding machine has a feed screw arrangement which plasticizes a material and which injects the plasticized material into a mold. The feed screw arrangement includes an input shaft which is mounted in a housing for rotation relative thereto and for axial displacement with and relative to the housing, the input shaft having a splined end portion which extends outwardly of the housing. The housing is mounted on a support for angular displacement about a pivot axis, and a drive is mounted on an auxiliary support for movement with respect to the support for the housing. The drive has an output shaft which has a central opening adapted to matingly receive the splined end portion of the input shaft when coaxial therewith. Relative axial displacement of the two shafts from an extended position in which the splined end portion is matingly received in the central recess to a retracted position in which the shafts are disengaged frees the feed screw arrangement for pivoting about the pivot axis. The support includes a base portion and a reinforcing portion which straddle the housing, and inlet openings for feeding a material into the housing are provided in both the reinforcing portion and the housing, which inlet openings are coaxial with one another and with the pivot axis.

9 Claims, 2 Drawing Figures

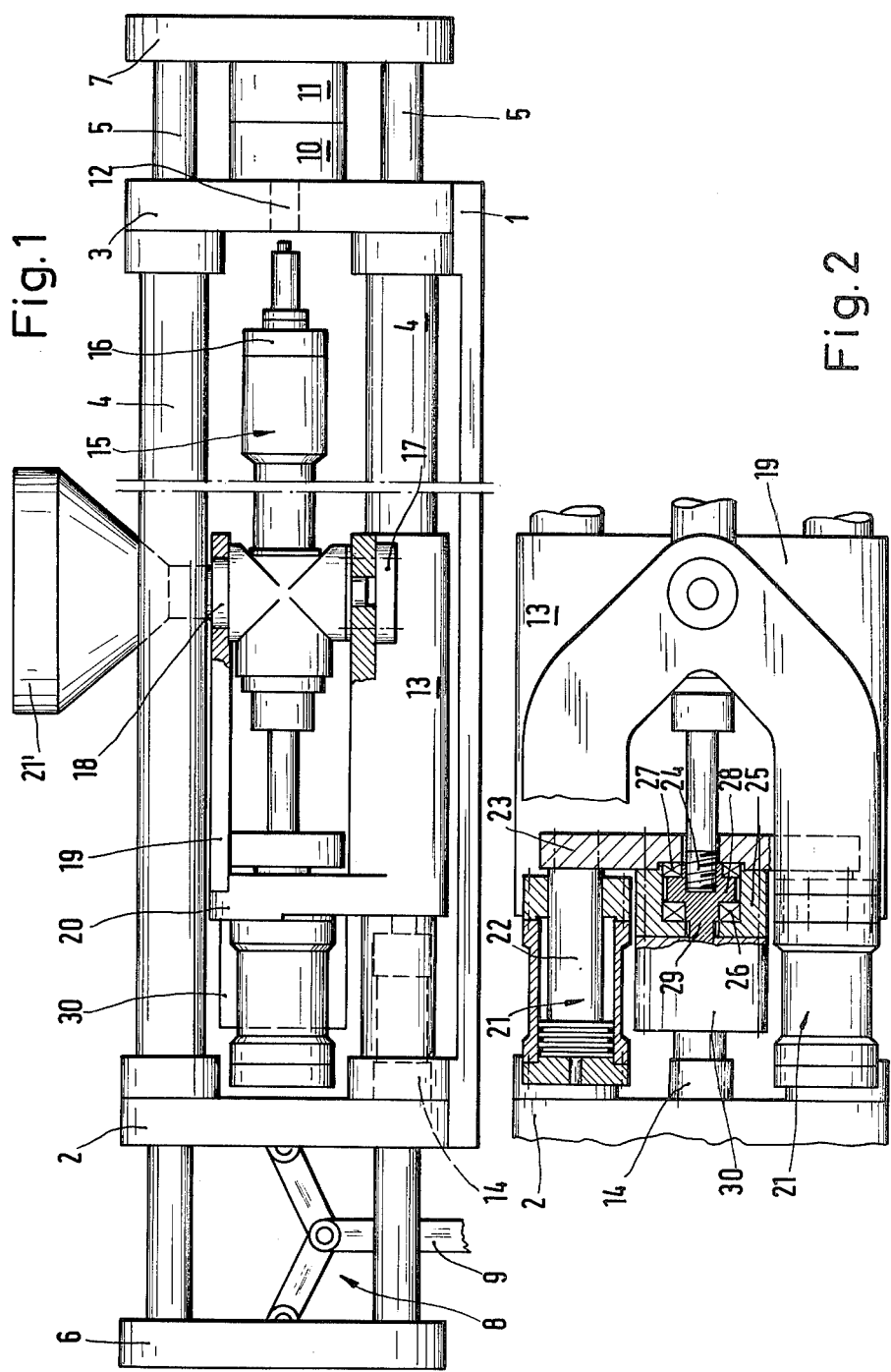

MOLDING MACHINE

BACKGROUND OF THE INVENTION

The present invention relates to a molding machine in general, and more particularly to a plasticizing and injecting device for use in an injection molding machine.

There are already known various constructions of injection molding machines which, generally speaking, include a mold consisting of two mold halves, a plasticizing and injecting arrangement mounted on a support for displacement toward and away from the mold, an arrangement for feeding synthetic plastic material granulate into the plasticizing and injecting arrangement, and a drive for the plasticizing and injecting arrangement. The present invention will now be explained as utilized in one particular type of an injection molding machine, but it is to be understood that the basic concept of the present invention can also be utilized in other types of injection molding machines.

The particular injection molding machine with which the present invention is concerned includes a support and a plurality of beams on which different parts of the machine are mounted for displacement relative to one another. The plasticizing and injecting arrangement of this particular machine includes a feed screw which is mounted in a housing for rotation about an axis of an input shaft, and also for axial displacement relative to the housing.

This type of an injection molding machine further includes a stationary platen and another platen which is mounted for displacement toward and away from the stationary platen. The two platens have support surfaces which face one another, and the two mold sections are connected to the support surfaces of the platens in alignment with one another. When this conventional injection molding machine is to be operated, the mold is closed by displacing the two platens toward one another so that the two mold sections form a mold, and the plasticized synthetic plastic material is injected into the interior of the mold through an inlet opening which passes through the stationary platen and through the mold section connected thereto. The plasticizing and injecting arrangement is mounted on the abovementioned beams at the side of the stationary platen which faces away from the mold and includes, in general, a plasticizing and injecting cylinder housing which is mounted on a support, and a plasticizing and injecting screw located in the interior of the housing. The housing has an inlet opening, and a funnel communicates with the inlet opening of the housing and serves the purpose of storing and conveying synthetic plastic material in form of granulate into the interior of the cylinder housing. Prior to injecting the synthetic plastic material, it must be plasticized, which is done in a conventional manner by rotating the plasticizing and injecting screw by energizing a drive for the screw. The granulated synthetic plastic material is engaged by the rotating screw and is transported in direction toward an outlet nozzle mounted at the end of the housing which faces toward the stationary platen. Simultaneously therewith, the feed screw conducts a movement in the axial direction thereof away from the stationary platen. When the material in the cylinder housing is plasticized in a conventional manner, the plasticizing and injecting screw is displaced axially in direction toward the stationary platen, so that the plasticized synthetic plastic material exits from the interior of the housing into the interior of the mold through the nozzle of the housing and the inlet opening of the mold. The above arrangement is fully conventional and has been described only to an extent necessary for understanding the present invention and the environment in which it is used.

Occasionally, the plasticizing and injecting screw must be either replaced or cleaned, so that access must be obtained to the interior of the housing from one of the ends thereof. In one known injection molding machine of the type here under consideration, the entire injection arrangement is mounted on the aforementioned beams for displacement relative thereto by means of so-called driving cylinders, in such a manner that the injection assembly can be laterally pivoted as soon as the nozzle disengages the stationary platen. This enables the operating personnel to gain access to the end of the injection assembly at which the nozzle is mounted, so that that part of the housing which carries the nozzle can be disassembled from the remainder of the housing so that the screw can be cleaned or removed from the housing. However, experience with this type of an apparatus has shown that such a disassembling operation is very time-consuming and laborious. In addition thereto, when the screw is either cleaned or replaced, and the housing reassembled, the position of the nozzle must always be adjusted in order to properly cooperate with the inlet opening of the mold. A further disadvantage of this arrangement is that the injection assembly must be pivoted in the lateral direction to such an extent until the end of the housing which carries the nozzle fully clears the stationary platen so as to enable the operating personnel to disassemble the housing without being hindered by the presence of the stationary platen during the disassembling operation. This, of course, makes the injecting assembly and thus the entire injection molding machine rather expensive.

SUMMARY OF THE INVENTION

It is a general object of the present invention to avoid the disadvantages of the prior art.

More particularly, it is an object of the present invention to provide an injection molding machine of the type here under consideration in which the cleaning or replacement of the screw can be accomplished in a simple manner.

It is a further object of the present invention to provide an injecting arrangement for use in an injection molding machine which is simple in construction and reliable in operation.

It is a concomitant object of the present invention to provide an injection arrangement for use in an injection molding machine in which the nozzle need not be disassembled from the housing when the screw is to be removed for cleaning or replacement purposes.

It is yet another object of the present invention to provide a laterally pivotable injecting arrangement in which the extent to which the arrangement need be pivoted is independent of the dimensions of the stationary platen.

Yet another object of the present invention is to so mount the injecting arrangement as to prevent distortions thereof.

A still further object of the present invention is to so arrange the inlet opening of the injection arrangement as to avoid the need for removing the feeding funnel from the housing as the same is laterally pivoted.

In pursuance of these objects and others which will become apparent hereafter, one feature of the present invention resides, briefly stated, in a molding machine, in a combination comprising feed screw means which is mounted for rotation about an axis; drive means for rotating the screw means; coupling means for disengageably connecting the drive means with the screw means; and means for mounting the screw means for pivoting about a pivot axis substantially normal to the above-mentioned axis when the coupling means is disengaged. Preferably, the drive means has an output shaft and the screw means has an input shaft, the mounting means mounting the input shaft for pivoting into and out of axial alignment with the output shaft. At least one of the shafts is mounted for axial displacement relative to the other shaft between a retracted position spaced from, and an extended position at the other shaft. The coupling means then may include complementary detent means at the shafts, the detent means being so constructed as to permit axial displacement of the one shaft between the abovementioned positions and to connect the shafts for shared rotation about the above-mentioned axis when the one shaft is in the extended position thereof. In this manner, it is achieved that the two shafts can be disengaged from one another in a simple manner by axially displacing the shafts, whereupon the screw means can be pivoted about the pivot axis so that the operating personnel can gain access to the screw means at that end thereof at which the input shaft is provided with the detent means, so that the screw which is part of the screw means can be taken out of the associated housing for replacement or cleaning purposes. Inasmush as the screw is taken out of the housing through the end of the latter which is remote from a mold, and from a platen on which the mold is mounted, it is possible it pivot the screw means about the pivot axis to a smaller extent than that necessary for the other end of the housing to clear the platen, and the part of the housing which carries the injection nozzle need not be disassembled from the remainder of the housing and subsequently reassembled and readjusted.

In a currently preferred embodiment of the present invention, the drive for the screw has an output shaft, and is supported, together with the output shaft, on an auxiliary support which can be displaced axially of the output shaft, and the feed screw arrangement has a housing mounted on a support for pivoting about the pivot axis, and a feed screw in the housing having an input shaft mounted for rotational and axial displacement relative to the housing. One of the shafts is then provided with a splined end portion, and the other shaft has a central recess which is adapted to matingly receive the splined end portion of the one shaft. At least one injecting cylinder-and-piston unit acts on the auxiliary support and may be so actuated as to displace the auxiliary support with the output shaft axially away from the support and the input shaft to thereby disengage the splined end portion from the central recess.

In order to avoid the possibility that the two shafts become misaligned with one another during the injection operation proper or that the shafts are subjected to radial loads, it is proposed, according to a further feature of the present invention, to mount the housing of the feed screw arrangement on a support which is rigid and which includes a base plate portion and a bracket portion which straddle the housing, the bracket portion being provided with an opening which communicates with the inlet opening of the housing of the screw arrangement. It is further preferred to so arrange the inlet opening of the housing and the opening in the reinforcing bracket portion as to be coaxial with the pivot axis of the screw arrangement, and to coaxially provide a feeding funnel which communicates with the inlet opening of the housing. The advantage of this arrangement is that when the screw arrangement is pivoted about the pivot axis, it is not necessary to disassemble the funnel from the bracket or from the housing. This is particularly advantageous in the event that the funnel is arranged between support beams which form a rigid machine frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a side elevational view of an injection molding machine of the present invention; and FIG. 2 is a partly sectioned fragmentary top plan view of the arrangement of FIG. 1.

DETAILED DESCRIPTION OF THE PREFERRED EMBODIMENTS

Referring now to the drawing in detail, and first to FIG. 1, it may be seen that the injection molding machine in which the present invention is employed includes a base 1 to which there is connected a plate 2 and a stationary platen 3. In the illustrated embodiment, four tubular beams 4 interconnect the plate 2 with the platen 3 so that the elements 1 to 4 constitute a stationary frame of the machine. Additional beams 5 are guided for movement in the beams 4, the additional beams 5 being connected with a plate 6 at one end and with a displaceable platen 7 at the other end. The elements 5 to 7 constitute a rigid displaceable frame of the machine which is mounted on the stationary frame 1 to 4 for displacement relative thereto. A toggle joint designated in toto with a reference numeral 8 is arranged between and connected to the plates 6 and 2, and a member 9 forming a part of a cylinder-and-piston unit is connected to the toggle joint 8 and adapted to extend and collapse the same so as to displace the plates 2 and 6 relative to one another.

The two platens 3 and 7 have support surfaces which face one another, and mold sections 10 and 11 are mounted on the support surfaces of the platens 3 and 7 for displacement toward and away from one another. As is well known, the two mold sections 10 and 11 form an internal cavity when assembled with one another, and the platen 3 is provided with an inlet opening 12 which communicates with the internal cavity of the mold sections 10 and 11. An injecting assembly is capable of communicating with the opening 12, the injection assembly including a support having a base portion 13, the support being mounted on the beams 4 for displacement longitudinally thereof. Driving cylinders 14 are provided which are capable of displacing the base portion 13 longitudinally of the beams 4. The injecting assembly further includes a plasticizing and injecting cylinder 15 which has two longitudinally spaced end portions at one of which there is provided a nozzle assembly 16, a pivot 17 mounting the cylinder 15 on the base portion 13 for pivoting about a pivot axis. The support further includes a reinforcing bracket portion 19, the portions 13 and 19 straddling the cylinder 15, and a connecting portion 20 which connects the portions 13 and 19 with one another. The cylinder 15 has an inlet opening for the material to be plasticized therein, and the reinforcing bracket portion 19 is formed with an opening 18 which is aligned with the inlet opening of the housing or cylinder 15. The elements 13, 18 and 20 constitute with one another a rigid frame for the housing or cylinder 15. A funnel 21 is arranged on the reinforcing bracket portion 19 in the region of the opening 18, the funnel 21 serving the purpose of storing granulated synthetic plastic material and supplying the same into the cylinder 15. In the illustrated currently preferred embodiment of the present invention, the pivot axis of the cylinder 15 coincides with the central axis of the opening 18 and also of the inlet opening of the cylinder 15 which is not illustrated.

As most clearly seen in FIG. 2, injecting cylinders 21 are connected to the plate 20, the cylinders 21 having piston rods 22 which pass through appropriate openings in the plate 20 and which are connected to an auxiliary support 23. The auxiliary support 23 is formed with an opening through which an end portion 24 of an input shaft of a plasticizing and injecting screw accommodated in the cylinder 15 can extend.

The auxiliary support 23 carries on its side which faces away from the cylinder 15 a connecting element 25, which is illustrated as a substantially cup-shaped housing, and an output shaft 28 is mounted in the interior of the connecting element 25 on axial or radial bearings 26 and 27. The output shaft 28 is provided with a central opening which has a shape which is complementary to the shape of the end portion 24 of the input shaft of the plasticizing and injecting assembly, the shapes of the end portion 24 and of the central opening receiving the same being so selected as to connect the two shafts with one another for shared rotation, but to permit disassembling and disconnection of the two shafts by moving one of the shafts in a generally axial direction thereof. While the end portion 24 has been illustrated as being provided with an external thread, which necessitates unwinding the end portion 24 from a tapped bore in the output shaft 28, it is proposed according to a currently preferred simpler embodiment of the present invention to form the end portion 24 with axially or substantially axially extending splines and to provide the bore in the output shaft 28 with corresponding alternating recesses and projections, in which event mere axial displacement of the two shafts relative to one another results in engagement or disengagement of the two shafts with one another.

The output shaft 28 has a shaft portion 29 which is driven into rotation by a drive 30 of conventional construction, the drive 30 having a housing which is connected to the connecting element 25. As mentioned above, it is currently preferred that the end portion 24 of the input shaft be externally splined, preferably in axial direction, and that the internal central opening of the output shaft 28 be complementarily configurated. However, it is also contemplated by the invention to use various different other connecting or coupling arrangements which transmit motion between the two shafts for rotating the input shaft about its axis, but which can be disengaged by moving one of the shafts in the axial direction thereof.

When the non-illustrated conventional feed screw accommodated in the interior of the housing 15 is to be removed therefrom for cleaning or replacement purposes, the cylinder-and-piston unit 14 is actuated and displaces the base portion 13 and thus the entire movable support in direction away from the platen 3 until the nozzle 16 is entirely removed from the opening 12. Subseqently thereto, the cylinders 21 are actuated in such a manner as to displace the piston rods and thus the auxiliary support 23 in a direction away from the stationary platen 3. This displacement of the auxiliary support 23 results in corresponding movement of the connecting element 25 and of the drive 30 and output shaft 28 supported therein, whereby the end portion 24 of the input shaft disengages from the output shaft 28 and clears the opening in the auxiliary support 23. Of course, if the end portion 24 is threaded as illustrated, the drive 30 must be rotated in a direction opposite to that in which it rotates during the normal operation of the machine. As soon as the end portion 24 clears the opening of the auxiliary support 23, the cylinder 15 can be pivoted about the axis of the pivot 17 in the lateral direction, so that access is gained to that end of the cylinder 15 from which the input shaft extends. Then, the housing 15 can be opened at this end thereof and the screw accommodated therein can be removed for cleaning and replacement purposes. It is also proposed according to the present invention to provide a locking arrangement which prevents pivoting of the housing 15 about the pivot axis of the pivot 17 until released, which gives to the entire assembly a greater degree of stability.

It will be understood that each of the elements described above, or two or more together, may also find a useful application in other types of constructions differing from the types described above.

While the invention has been illustrated and described as embodied in an injection molding machine, it is not intended to be limited to the details shown, since various modifications and structural changes may be made without departing in any way from the spirit of the present invention. So, for instance, the basic injection molding machine may be of a different type from that described and illustrated such as that type in which, instead of various frames which are mounted on one another for relative displacement, only the movable platen is displaced relative to the stationary platen.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a molding machine, a combination comprising feed screw means having an input shaft mounted for rotation about an axis; drive means for rotating said screw means and having an output shaft; means for mounting said screw means for pivoting into and out of alignment of said input with said output shaft about a pivot axis substantially normal to said axis; means for mounting at least one of said shafts for axial displacement relative to the other shaft between a retracted position spaced from and an extended position at said other shaft; and coupling means for disengageably connecting said drive means with said screw means and permitting said pivoting when disengaged, including complementary detent means at said shafts, said detent means permitting said axial displacement of said one shaft between said positions and connecting said shafts for shared rotation about said axis when said one shaft is in said extended position.

2. A combination as defined in claim 1, wherein said detent means includes an outwardly splined end portion at one of said shafts, the other shaft being formed with a complementary central recess adapted to matingly receive said splined end portion.

3. A combination as defined in claim 1, and further including means for displacing said one shaft between said positions thereof.

4. In a molding machine, a combination comprising feed screw means having an input shaft having a splined end portion and mounted for rotation about an axis; drive means for rotating said screw means; coupling means for disengageably connecting said drive means with said screw means, including an output shaft adapted to be driven into rotation by said drive means and having a central recess adapted to matingly receive said splined end portion; means for mounting said screw means for pivoting about a pivot axis substantially normal to said axis when said coupling means is disengaged, including a support; an auxiliary support for said drive means and said output shaft; and means for mounting said auxiliary support for displacement in axial direction of said output shaft relative to said support between an extended position in which said splined portion is received in said central recess, and a retracted position in which said splined end portion is disengaged from said central recess.

5. In a molding machine, a combination comprising feed screw means mounted for rotation about an axis and including a housing and a feed screw having an input shaft mounted in said housing for rotation about said axis and for axial displacement relative to said housing, said input shaft having a splined end portion extending outwardly of said housing; drive means for rotating said screw means; coupling means for disengageably connecting said drive means with said screw means and including an output shaft adapted to be driven into rotation by said drive means and having a central recess adapted to matingly receive said splined end portion of said input shaft; means for mounting said screw means for pivoting about a axis substantially normal to said axis when said coupling means is disengaged, including a support for mounting said housing of said screw means for pivoting into and out of a position in which said splined end portion is axially aligned with said central recess; and an auxiliary support for mounting said drive means and said output shaft for axial displacement relative to said support between an extended position in which said splined end portion is matingly received in said central recess, and a retracted position in which said splined end portion is disengaged from said output shaft.

6. In a molding machine, a combination comprising a stationary frame including a stationary plate, a stationary platen, and a plurality of tubular beams distributed about and parallel to an axis and interconnecting said stationary plate and platen to surround a space therewith; a movable frame including a plurality of beams mounted in said tubular beams for axial movement and having ends which extend out of said tubular beams, a movable plate connected to those of said ends which extend beyond said stationary plate, and a movable platen connected to the remaining ends which extend beyond said stationary platen; a split mold having two mold parts each of which is interchangeably mounted on one of said platens in axial alignment with the other mold part and together defining a molding cavity; means arranged between and acting on said plates and operative for moving said movable frame axially of said stationary frame to thereby open and close said mold; and means for introducing molding material into said cavity of said closed mold, including a passage through said stationary platen and the mold part mounted thereon and having an inlet port coaxially communicating with said space and an outlet port communicating with said cavity, feed screw means arranged in said space and having a rotary axis, means for mounting said screw means on said stationary frame for pivoting about a pivot axis substantially normal to said rotary axis between an operating position in which said rotary axis coincides with said axis and said screw means communicates with said inlet port and at least one servicing position in which said rotary axis encloses an angle with said axis, drive means for rotating said screw means about said rotary axis and mounted on said stationary frame, and coupling means for disengageably connecting said drive means with said screw means in said operating position and for releasing said screw means for said pivoting between said positions only upon disengagement.

7. A combination as defined in claim 6, wherein said screw means includes a housing having an inlet opening; and wherein said mounting means includes a rigid support frame having at least a base portion and a reinforcing portion which straddle said housing, said reinforcing portion having an opening aligned with said inlet opening of said housing for admitting material into said housing.

8. A combination as defined in claim 7, wherein said opening and said inlet opening are coaxial with said pivot axis.

9. A combination as defined in claim 6, wherein said screw means includes a housing and a plastifying screw mounted in said housing for rotation about said rotary axis and also for displacement along the latter; wherein said mounting means includes a rigid support frame having a base portion and a reinforcing portion which together straddle said housing, and a connecting portion extending between and rigidly interconnecting said base and reinforcing portions with one another and having a side that faces away from said screw means; further comprising means for displacing said plastifying screw along said rotary axis relative to said housing, including at least one displacing cylinder-and-piston unit having a cylinder rigidly connected to said connecting portion at said side thereof, a piston within said cylinder, and a piston rod connected to said portion and having a free end portion extending through said connecting portion toward said screw means, and a transverse plate mounted on said free end portion of said piston rod for displacement therewith toward and away from said connecting portion; and wherein said drive means and said coupling means are mounted on said transverse plate for displacement therewith, said drive means at that side of the latter which faces away from said screw means.

* * * * *